(12) United States Patent
Mangum et al.

(10) Patent No.: US 6,368,431 B2
(45) Date of Patent: *Apr. 9, 2002

(54) AIR BAG INFLATOR (75) Inventors: Michael G. Mangum, Mesa; David C. Ouart, Gilbert, both of AZ (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,028

(22) Filed: Nov. 12, 1997

(51) Int. Cl.[7] .................. C06B 45/10; C06B 31/02; C06D 5/00; B60R 21/28
(52) U.S. Cl. .................. 149/19.7; 280/741; 102/530; 149/19.8; 149/61
(58) Field of Search ................ 102/288, 289, 102/530; 280/741, 742, 737, 736; 149/94, 109.6, 19.8, 61, 19.7

(56) References Cited

U.S. PATENT DOCUMENTS

| | | |
|---|---|---|
| 3,113,058 A | 12/1963 | Butcher |
| 3,657,028 A | 4/1972 | Pannell |
| 4,983,235 A * | 1/1991 | Nyqvist et al. ........ 149/109.6 |
| 5,062,365 A | 11/1991 | Canterberry .............. 102/322 |
| 5,125,684 A | 6/1992 | Cartwright ................ 280/736 |
| 5,160,163 A | 11/1992 | Castagner et al. ........ 280/740 |
| 5,507,891 A | 4/1996 | Zeigler ..................... 149/47 |
| 5,510,062 A | 4/1996 | O'Meara et al. |
| 5,520,756 A | 5/1996 | Zeigler ................... 149/19.8 |
| 5,524,544 A | 6/1996 | O'Meara et al. |
| 5,553,889 A | 9/1996 | Hamilton et al. ........... 280/736 |
| 5,589,141 A | 12/1996 | Sides et al. ................. 422/164 |
| 5,602,361 A | 2/1997 | Hamilton et al. ........... 102/288 |
| 5,616,883 A | 4/1997 | Hamilton et al. ........... 102/288 |
| 5,623,116 A * | 4/1997 | Hamilton et al. ........... 102/289 |
| 5,627,337 A | 5/1997 | Hamilton et al. ........... 102/290 |
| 5,630,618 A | 5/1997 | Hamilton et al. ........... 280/736 |
| 5,695,216 A * | 12/1997 | Sandstrom et al. ......... 280/737 |
| 5,788,275 A * | 8/1998 | Butt et al. .................. 280/737 |
| 5,821,448 A * | 10/1998 | Hamilton et al. ........... 102/288 |
| 5,868,424 A * | 2/1999 | Hamilton et al. ........... 280/741 |
| 5,913,537 A * | 6/1999 | Goetz ........................ 280/741 |

OTHER PUBLICATIONS

Hawley, Condensed Chemical Dictionary, Eighth Edition, p. 181, 1971.*
U. S. Patent Application. Serial No. 08,702,838, filed Aug. 23, 1996 entitled "Air Bag Inflator". Patent No. 6,120,058.
U. S. Patent Application. Serial No. 08,489,032, filed Jun. 9, 1995 entitled "Inflator Assembly", Patent No. 5,913,537.

* cited by examiner

Primary Examiner—Charles T. Jordan
Assistant Examiner—Aileen J. Baker
(74) Attorney, Agent, or Firm—Tarolli, Sundheim, Covell, Tummino & Szabo L.L.P.

(57) ABSTRACT

An apparatus (2) for inflating an air bag (4) including a container (12) and a combustible material (20) disposed in the container. The combustible material (20) comprises a binder selected from the group consisting of cellulose acetate butyrate and cellulose acetate propionate. The binder has a melting point in the range of about 230° C. to about 260° C. An igniter (32) ignites the combustible material (20) to generate combustion products. A conduit directs the combustion products towards the air bag (4).

18 Claims, 7 Drawing Sheets

AIR BAG INFLATOR

The present invention relates to an apparatus for inflating a vehicle occupant protection device. The present invention particularly relates to a hybrid inflator.

BACKGROUND OF THE INVENTION

A hybrid inflator for inflating a vehicle occupant protection device includes a quantity of a stored gas and a body of combustible material. The body of combustible material typically comprises a binder which is mixed with the other components of the body of combustible material to help form a moldable or extrudable mass. An igniter is actuatable to ignite the body of combustible material. As the body of combustible material burns, combustion products heat the stored gas. This increases the pressure of the stored gas. The heated stored gas and the combustion products form an inflation fluid for inflating the vehicle occupant protection device.

If the ambient temperature surrounding the inflator becomes too high, the binder, and thus the body of combustible material could deform. Deformation of the body of combustible material could reduce the reliability of ignition and the output production of the body of combustible material. Accordingly, it is desirable to provide a body of combustible material which can resist deformation and can ignite and combust reliably after withstanding exposure to relatively high temperatures for extended periods of time.

SUMMARY OF THE INVENTION

The present invention relates to an apparatus for use in inflating a vehicle occupant protection device. The apparatus comprises a container and a combustible material stored in the container. The combustible material comprises a binder selected from the group consisting of cellulose acetate butyrate and cellulose acetate propionate. The binder has a melting point in the range of about 230° C. to about 260° C. Igniter means is provided for igniting the combustible material. The combustible material, when ignited, burns and generates combustion products. A conduit directs the combustion products toward the vehicle occupant protection device.

BRIEF DESCRIPTION OF THE DRAWINGS

The file of this patent contains at least one drawing executed in color: Copies of this patent with color drawings will be provided by the Patent and Trademark Office upon request and payment of the necessary fee.

The foregoing and other objects and features of the present invention will become more apparent to one skilled in the art upon a consideration of the following description of the invention and the accompanying drawings, in which.

DETAILED DESCRIPTION OF THE PRESENT INVENTION

Figures 1, 2:
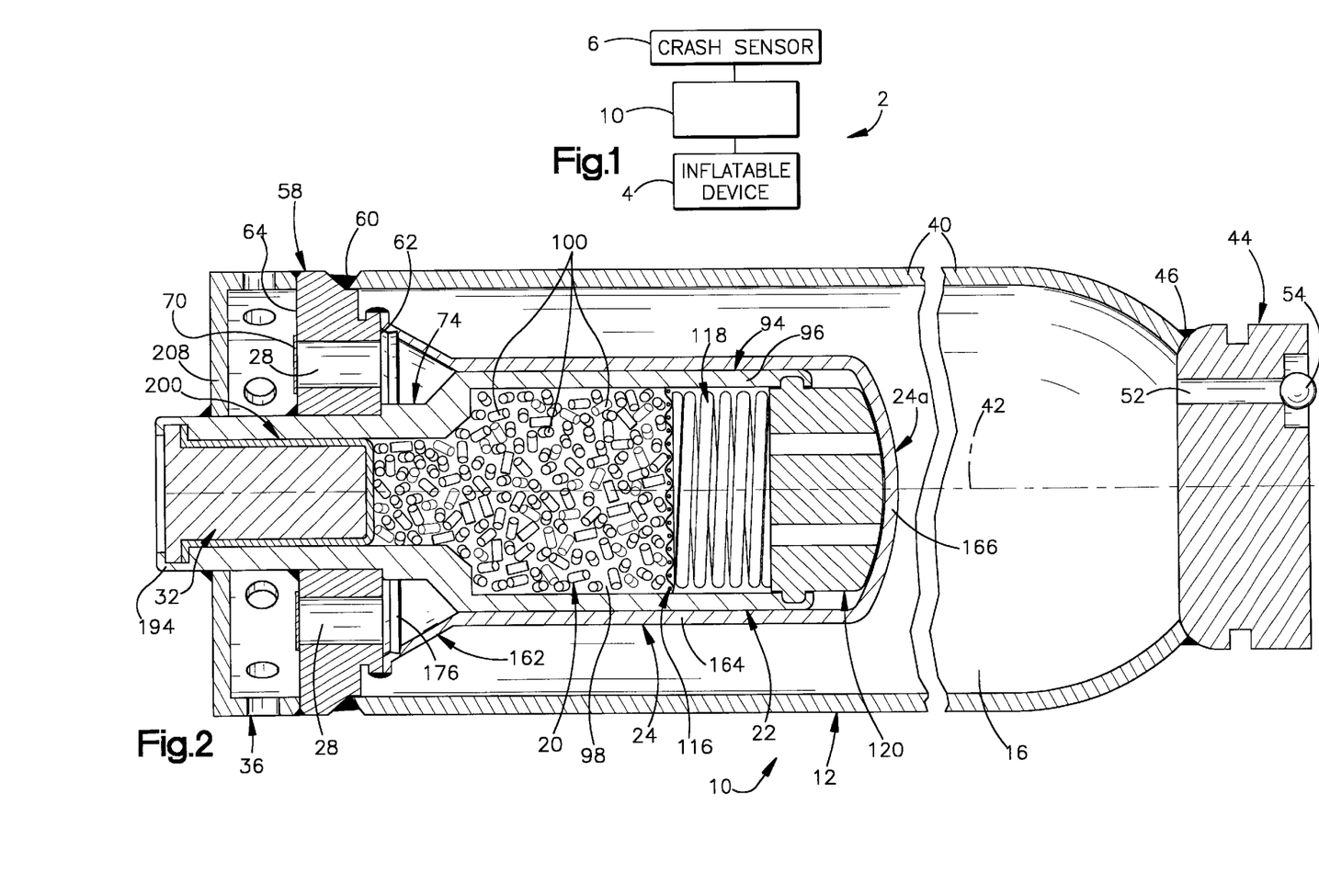
FIG. 1 is a schematic view of a vehicle occupant protection apparatus.
FIG. 2 is a sectional view of an inflator constructed in accordance with a preferred embodiment of the present invention.

The present invention relates to an inflator 10 for providing inflation fluid for inflating an inflatable vehicle occupant protection device. Referring to FIG. 1, a vehicle occupant protection apparatus 2, with which the inflator 10 of the present invention is useful, is illustrated.

The apparatus 2 includes an inflatable vehicle occupant protection device 4. In the preferred embodiment of the present invention, the protection device 4 is an air bag. Other inflatable vehicle occupant protection devices that can be used with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 4. When the air bag 4 is inflated, it extends into a vehicle occupant compartment (not shown) to help protect a vehicle occupant from a forceful impact with parts of the vehicle as a result of a crash.

The apparatus 2 also includes a crash sensor 6. The crash sensor 6 is a known device which senses a vehicle condition that indicates the occurrence of a crash. If the vehicle condition sensed by the crash sensor 6 is at or above a predetermined threshold level, it indicates the occurrence of a crash having at least a predetermined threshold level of severity. The threshold level of crash severity is a level at which inflation of the air bag 4 is desired for protection of a vehicle occupant.

The vehicle condition sensed by the crash sensor 6 typically is sudden vehicle deceleration that is caused by a collision. The magnitude and duration of the deceleration are measured by the crash sensor 6. If the magnitude and duration of the deceleration meet or exceed predetermined threshold levels, they indicate the occurrence of a crash that meets or exceeds the predetermined threshold level of crash severity. A deployment signal is then transmitted to the inflator 10 to actuate the inflator.

Figure 3:
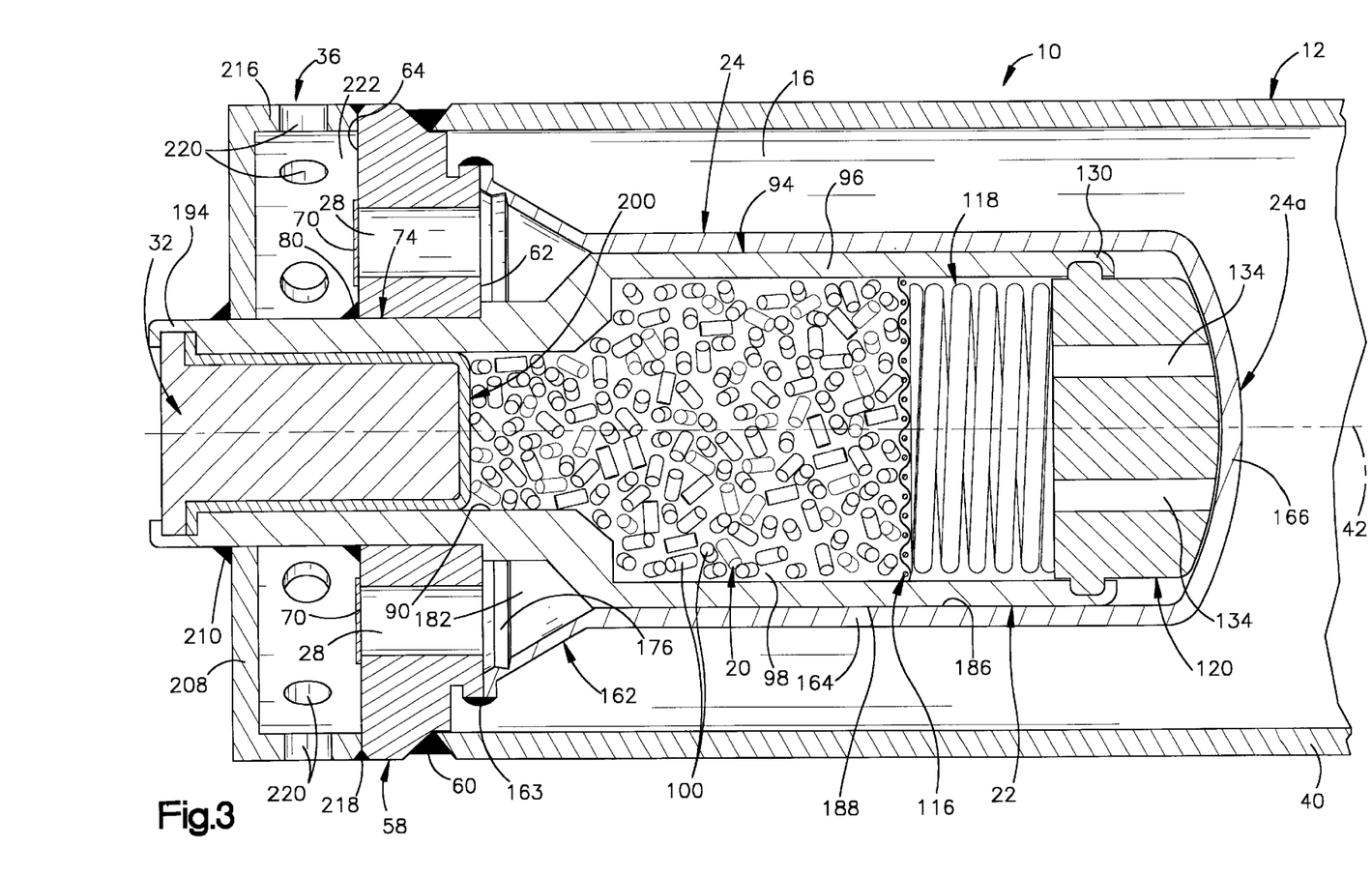
FIG. 3 is an enlarged fragmentary sectional view of a portion of the inflator of FIG. 2.
Figures 4, 5:
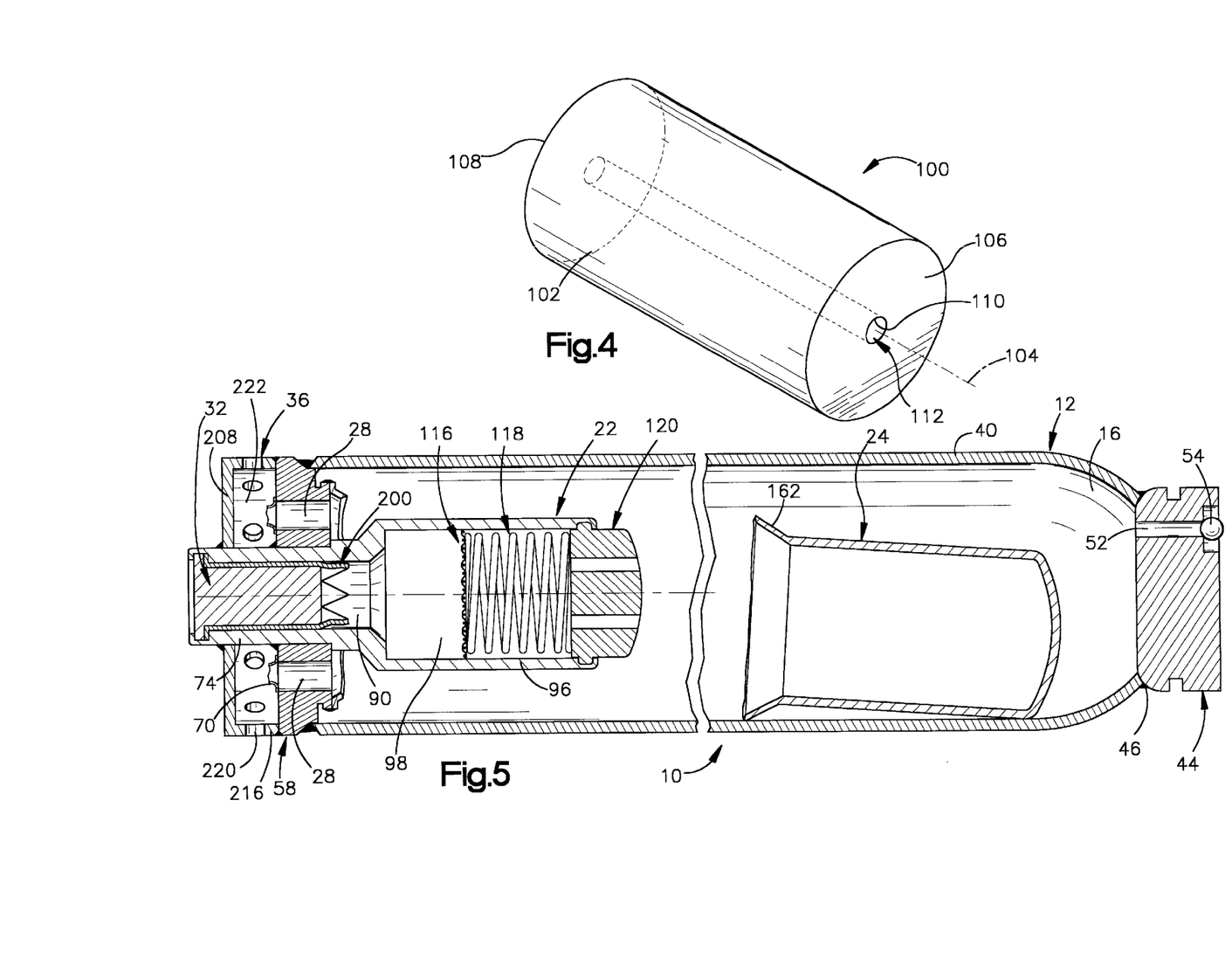
FIG. 4 is an enlarged view of a part in FIG. 2.
FIG. 5 is a sectional view, generally similar to FIG. 2, illustrating the relationship between parts of the inflator of FIG. 2 after the inflator has been actuated.

While the inflator 10 could be a pyrotechnic inflator (not shown), in the preferred embodiment of the invention, the inflator 10 is a hybrid inflator (FIGS. 2, 3 and 5). Referring to FIG. 2, the hybrid inflator 10 includes a generally cylindrical container 12 having a chamber 16 which holds a supply of stored gas. A cup shaped closure member 24 blocks gas flow from the chamber 16 through a plurality of discharge passages 28. The cup shaped closure member 24 has a closed end 24a and an opposite open end. A body 20 of combustible material is disposed in a housing 22. The body 20 of combustible material and the housing 22 extend into the cup shaped closure member 24. A schematically illustrated igniter 32 is also disposed within the housing 22. Many different types of igniters can be used, such as Model Numbers 150222, 150223, 150460, 150472, 150541 and 150545 manufactured by Special Devices Inc., of Newhall, Calif.

When the air bag 4 is to be inflated, the igniter 32 is activated to ignite the body 20 of combustible material. Ignition of the body 20 of the combustible material creates heat and combustion products which apply pressure against the closed end 24a of the closure member 24. The pressure applied to the closed end 24a of the closure member 24 breaks the closure member and moves it away from the discharge passages 28, as shown in FIG. 5.

The container 12 (FIG. 2) includes a cylindrical one-piece steel side wall 40. The side wall 40 has a longitudinal central axis which is coincident with a longitudinal central axis 42 of the container 12. The container 12 also includes a one-piece circular steel end wall 44 which is connected with the right end (as viewed in FIG. 2) of the side wall 40 at an annular weld 46. A fill passage 52 is formed in the end wall 44 and is closed by suitable means such as a steel ball 54 welded in place. The circular end wall 44 is coaxial with the side wall 40. The central axis 42 of the container 12 extends through the center of the end wall 44.

A circular steel end wall 58 is connected with the left end (as viewed in FIG. 2) of the side wall 40 by an annular weld 60. The left end wall 58 is disposed in a coaxial relationship with the right end wall 44 and the side wall 40 of the container 12. The left end wall 58 has parallel inner and outer, radially extending side surfaces 62 and 64. Inner side surface 62 is presented toward the interior of the container 12, while the outer side surface 64 is presented away from the interior of the container. The weld 60 connects the left end (as viewed in FIG. 2) of the side wall 40 with the left end wall 58 at a location intermediate to the inner and outer side surfaces 62 and 64.

The discharge passages 28 are formed in the left end wall 58 and have cylindrical configurations with central axes which extend parallel to the central axis 42 of the container 12. The discharge passages 28 are arranged in an annular array about the central axis 42 of the container 12. Although only two discharge passages 28 are shown in FIG. 2, it should be understood that there are more than two discharge passages formed in the end wall 58. The number, arrangement and flow area of the discharge passages 28 can vary as desired.

An annular metal foil seal 70 is secured by a suitable adhesive to the outer side surface 64 of the end wall 58 across the ends of each of the discharge passages 28. The seal 70 blocks the conduction of moisture from the environment around the inflator assembly 10 through the discharge passages 28.

The housing 22, which encloses the body 20 of combustible material, has a central axis which is coincident with the central axis 42 of the container 12. The housing 22 includes a tubular base section 74 (FIG. 3) which extends through the end wall 58 of the container 12. The base section 74 is generally circular in transverse section. An annular weld 80 connects the base section 74 of the housing 22 with the outer side surface 64 of the end wall 58. A cylindrical passage 90 extends through the center of the base section 74 of the housing 22. The igniter 32 is located in a portion of the passage 90.

A tubular main section 94 of the housing 22 is formed as one piece with the base section 74. The main section 94 of the housing 22 includes a cylindrical side wall 96. The side wall 96 and the base section 74 have longitudinal central axes which are coincident with the central axis 42 of the container 12. The cylindrical side wall 96 has a relatively large outer diameter. Therefore, the base section 74 flares radially outward to the side wall 96 of the main section 94 of the housing 22.

The main section 94 of the housing 22 has a cylindrical housing chamber 98 (FIG. 3). The housing chamber 98 has a longitudinal central axis which is coincident with the central axis 42 of the container 12.

A retainer 116 is disposed within the chamber 98 adjacent to the body 20 of combustible material. A spiral spring 118 is disposed within the chamber 98 adjacent to the retainer 116 and on a side of the retainer opposite the body 20 of combustible material. A strainer 120 is disposed within the chamber 98 between the spring 118 and the closed end 24a of the closure member 24. The retainer 116 is a thin circular-shaped mesh of metallic wire. The retainer 116 is urged by the spring 118 against the body 20 of combustible material to maintain the body 20 of combustible material in a packed arrangement.

The strainer 120 (FIG. 3) is preferably a powdered metal part. An annular crimp or rim 130 at the right end (as viewed in FIG. 3) of the cylindrical housing side wall 96 engages the strainer 120 to hold the strainer in place in the housing 22.

A plurality of passages are provided in the strainer 120 to conduct combustion products, including heat, which are created upon ignition of the body 20 of combustible material. Specifically, the strainer 120 has four equally spaced cylindrical main passages 134 (two of which are shown in FIG. 3), which extend through the strainer 120. The passages 134 conduct combustion products from the body 20 of combustible material through the strainer 120 towards the closed end 24a of the closure member 24.

As discussed above, the closure member 24 (FIG. 3) blocks gas flow from the chamber 16 through the discharge passages 28 and encloses the main section 94 of the housing 22. The closure member 24 includes a skirt section 162 which is connected to the flat circular inner side surface 62 of the end wall 58 (FIG. 3). The closure member 24 has a cylindrical side wall 164 which is connected to and is coaxial with the skirt section 162. The side wall 164 encloses the main section 94 of the housing 22 and the body 20 of combustible material. An imperforate substantially circular end wall 166 of the closure member 24 is connected with the right end (as viewed in FIG. 3) portion of the side wall 164 and closes the end 24a of the cup shaped closure member. The end wall 166 extends across the right end (as viewed in FIG. 3) of the housing 22. The skirt section 162 is connected to the end wall 58 by weld 163.

Referring to FIG. 3, the cylindrical main section 94 of the housing 22 has an outer surface which is located radially inward of the longitudinal axes of the individual discharge passages 28. Therefore, the skirt section 162 flares axially away and radially outward from the main section 94 of the housing 22 toward the left end wall 58. However, it is contemplated that the main section 94 of the housing 22 could be formed with a somewhat larger diameter so that the skirt section 162 could be cylindrical and still circumscribe the annular array of discharge passages 28.

An annular frangible section 176 (FIG. 3) of reduced thickness is formed in the skirt section 162. The frangible section 176 is breakable under the influence of tensile forces transmitted from the end wall 166 of the cup shaped closure member 24 upon ignition of the body 20 of combustible material. The frangible section 176 is coaxial with the central axis 42 of the container 12 and extends around the base section 74 of the housing 22.

The skirt section 162 cooperates with the end wall 58 and the base section 74 to form an annular manifold chamber 182. The manifold chamber 182 extends around the base section 74 of the housing 22 and has a longitudinal central axis which is coincident with the central axis 42 of the container 12. The discharge passages 28 in the end wall 58 have circular inner ends which open to the manifold chamber 182.

Prior to breaking the frangible section 176 of the skirt section 162, the manifold chamber 182 is isolated from the supply of stored gas in the chamber 16. Thus, the fluid pressure in the manifold chamber 182, prior to the breaking of the frangible section 176, will be approximately atmospheric pressure.

The tubular side wall 164 (FIG. 3) of the closure member 24 has a cylindrical inner side surface 186 which is disposed in engagement with a cylindrical outer side surface 188 of the main section 94 of the housing 22. The inner side surface 186 of the side wall 164 is freely slidable along the outside of the housing 22 under the influence of gas pressure applied against the end wall 166 after ignition of the body 20 of combustible material and breaking of the frangible section 176 of the closure member 24.

The igniter 32, which is located in the passage 90 (FIG. 3) extending through the base section 74 of the housing 22, has a cylindrical configuration. The igniter 32 is axially aligned with the left end (as viewed in FIG. 3) of the body 20 of combustible material. An annular crimp or rim 194 at the left end (as viewed in FIG. 3) of the base section 74 of the housing 22 engages an outer metal casing of the igniter 32 to hold the igniter in place in the housing 22. The igniter 32 includes a pyrotechnic charge which may be zirconium potassium perchlorate, titanium potassium perchlorate, or $BKNO_3$ or, if desired, a different chemical composition.

The igniter 32 is connected with the crash sensor 6 which detects vehicle deceleration. If the crash sensor 6 detects vehicle deceleration of a magnitude and duration requiring actuation of the air bag 4 to protect a vehicle occupant, the crash sensor completes an electrical circuit with an energy source. Completing the electrical circuit actuates the igniter assembly 32 to effect ignition of the body 20 of combustible material.

A one-piece seal cup 200 (FIG. 3) is disposed in the passage 90 and receives the igniter 32 to block the conduction of moisture to the body 20 of combustible material from the environment around the inflator 10. The seal cup 200 is formed as a single piece of metal and has a thickness of between about 0.20 and about 0.30 millimeters. A plurality of score lines (not shown) extend diametrically across the right (as viewed in FIG. 3) end wall of the seal cup 200. The score lines have a depth of approximately 0.05 to about 0.10 millimeters. The score lines weaken the seal cup 200 so that it is easily ruptured upon activation of the igniter 32.

A diffuser 36 is formed from a single piece of steel and has a circular end wall 208 (FIG. 3). The diffuser end wall 208 is connected to the base section 74 of the housing 22 by an annular weld 210 and extends radially outward from the base section. The end wall 208 of the diffuser 36 has a longitudinal central axis which is coincident with the central axis 42 of the container 12.

A cylindrical side wall 216 (FIG. 3) of the diffuser 36 is formed as one piece with the end wall 208 and extends axially from the outer periphery of the end wall 208. The outer diameter of the cylindrical side wall 216 of the diffuser 36 is essentially the same as the diameter of the outer side surface 64 on the end wall 58. The cylindrical side wall 216 of the diffuser 36 is connected to the outer side surface 64 of the container end wall 58 by weld 218.

An annular array of radially extending cylindrical passages 220 is formed in the side wall 216 of the diffuser 36. The combined flow area of the passages 220 is larger than the combined flow area of the passages 28 in the end wall 58. The radially extending passages 220 are connected in fluid communication with an annular diffuser chamber 222 which is defined by the diffuser 36, the container end wall 58, and the base section 74 of the housing 22. The diffuser chamber 222 extends around the base section 74 of the housing 22. The diffuser passages 220 are also connected in fluid communication with the inside of the air bag 4.

The housing 22, closure member 24, and diffuser 36 are all connected with the end wall 58 of the container 12. By connecting the housing 22, closure member 24 and diffuser 36 to the end wall 58, these components of the inflator 10 can be mounted as a unit on the side wall 40 of the container. The igniter 32 can be connected to the housing 22 after the end wall 58, housing 22, closure member 24 and diffuser 36 have been connected as a unit with the side wall 40 of the container 12.

In the preferred embodiment, the body 20 of combustible material comprises a plurality of randomly oriented cylindrical grains 100 disposed within the chamber 98 and part of the passage 90. Each of the grains 100 may be similar or identical in configuration.

The configuration of a typical grain 100 is shown in detail in FIG. 4. The grain 100 has a cylindrical outer surface 102 centered on an axis 104. The grain 100 further has first and second opposite side surfaces 106 and 108. Each of the opposite side surfaces 106 and 108 has a circular shape centered on the axis 104 and is generally perpendicular to the axis 104.

The grain 100 preferably has a cylindrical inner surface 110, which defines a respective cylindrical passage 112 extending axially through the grain 100. Although the grain 100 is shown in the preferred embodiment as having one passage 112, it is contemplated that the grain 100 may have a plurality of passages which may vary in arrangement and diameter. For instance, in addition to the cylindrical passage 112, the grain 100 may also have six or eighteen other passages extending through the grain.

Although the body 20 of combustible material has been illustrated as being a plurality of randomly oriented cylindrical grains 100, it is contemplated that the body 20 of combustible material could be formed with a different configuration if desired. For instance, the body 20 of combustible material may have a multi-lobe cross-sectional configuration or may comprise a plurality of stacked cylinders.

The body 20 of combustible material contains a quantity of a non-metallic nitrogen containing compound. The non-metallic nitrogen containing compound is a material capable of undergoing rapid and substantially complete oxidation. The preferred non-metallic nitrogen containing compound is a smokeless powder such as is used in the manufacture of explosives and ammunition. The non-metallic nitrogen containing compound may be a material utilized in a low vulnerability ammunition ("LOVA").

The non-metallic nitrogen containing compound is preferably a material selected from the group consisting of nitroguanidine, triaminoguanidinenitrate, ethylene dinitramine, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine and pentaerythritol tetranitrate and mixtures thereof. Preferably, the non-metallic nitrogen containing compound is cyclotrimethylenetrinitramine (RDX). A second preferred non-metallic nitrogen containing compound is cyclotetramethylenetetranitramine (HMX).

The non-metallic nitrogen containing compound is present in the body 20 of combustible material in an amount of about 20% to about 80% by weight based on the weight of the body 20 of combustible material. Preferably, the non-metallic nitrogen containing compound is present in the body 20 of combustible material in an amount of about 50% by weight based on the weight of the body 20 of combustible material.

The body 20 of combustible material may also include a solid oxidizer material. An oxidizer, when used, enhances the combustion of the body 20 of combustible material and reduces the production of toxic gases such as carbon monoxide (CO), hydrogen cyanide (HCN), and oxides of nitrogen ($NO_x$).

Suitable oxidizer materials include ammonium nitrate, alkali metal nitrates, alkali-earth metal nitrates, ammonium perchlorate, alkali metal perchlorates, alkali-earth metal perchlorates, organo-ammonium nitrates and ammonium dinitramide. Suitable alkali metals include, but are not limited to, lithium, sodium, potassium, rubidium, and cesium. Suitable alkaline-earth metals include, but are not limited to, magnesium, calcium, strontium, and barium. Suitable organo-ammonium nitrates include, but are not limited to, tetramethylammonium nitrate, hydroxylammonium nitrate, and tetraalkylammonium nitrate.

When an oxidizer material is used, it is desirable that it be present in the body 20 of combustible material in an amount of no more than about 60% by weight based on the weight of the body 20 of combustible material. Preferably, the oxidizer material is present in the body 20 of combustible material in an amount of about 30% by weight based on the weight of the body 20 of combustible material. Most preferably, the oxidizer material in the body 20 of combustible material comprises an amount of about 20% by weight potassium perchlorate and an amount of about 10% by weight potassium nitrate based on the weight of the body 20 of combustible material.

The body 20 of combustible material also includes a cellulosic binder material which is mixed with the non-metallic nitrogen containing compound and any oxidizer material to provide an intimate mixture of a moldable or extrudable plastic mass.

Suitable cellulosic binder materials include one or more of a first group of cellulose based binders having melting point ranges between about 230° C. and about 260° C. (hereinafter referred to as "Group I binders"). The Group I binders include cellulose acetate butyrates having less than about 30% butyryl group by weight based on the weight of the cellulose acetate butyrate compound and cellulose acetate propionates having more than about 30% propionyl groups by weight based on the weight of the cellulose acetate propionate compound.

A preferred Group I binder is CAB 171-15S which is a product of Eastman Chemical Co. CAB 171-15S comprises about 17% butyryl groups by weight, about 29.5% acetyl groups by weight, about 1.1% hydroxyl groups by weight and about 52.4% cellulose by weight, based on the weight of the CAB 171-15S. CAB 171-15S has a melting point range of about 230° C. to about 240° C.

Even though nitrocellulose and cellulose acetate are cellulosic binders and may have melting point ranges between about 230° C. and about 260° C., they are not preferred for use as a Group I binder. This is because nitrocellulose does not possess acceptable heat aging characteristics for use in a body of combustible material in an inflator if a substantial amount of nitrocellulose is used. Nitrocellulose chemically decomposes at relatively low temperatures because of its nitrate ester groups. Cellulose acetate has a relatively high glass transition temperature which makes the body of combustible material too brittle for use in an inflator if a substantial amount of cellulose acetate is used. Also, cellulose acetate has a relatively low range of compatibility with plasticizers.

The cellulosic binder materials may also include one or more of a second group of cellulose based binders (hereinafter referred to as "Group II binders"). The Group II binders generally have lower molecular weights than the Group I binders. The Group II binders also have melting point ranges which may be at least about 10° C. lower than the melting point ranges of the Group I binders and preferably in the range of about 125° C. to 205° C. Preferred Group II binders include cellulose acetate butyrates having more than about 30% butyryl groups by weight based on the weight of the cellulose acetate butyrate and cellulose acetate propionates having less than about 30% propionyl groups by weight based on the weight of the cellulose acetate propionate.

Cellulose acetate and nitrocellulose (containing between 11% to 13.4% nitrogen) may also be used as a Group II binder if used in relatively small amounts. When cellulose acetate is used as a Group II binder, it is desirable that it be present in the body 20 of combustible material in an amount in which the glass transition temperature of the cellulosic binder materials is less than about 165° C. Most preferably, it is desirable that the cellulose acetate be present in the body 20 of combustible material in an amount of no more than about 6% by weight based on the weight of the body 20 of combustible material. When nitrocellulose is used as a Group II binder, it is desirable that it be present in the body 20 of combustible material in an amount in which the glass transition of the cellulosic binder materials is less than about 165° C. Most preferably, it is desirable that the nitrocellulose be present in the body 20 of combustible material in an amount of no more than about 6% by weight based on the weight of the body 20 of combustible material.

The cellulosic binder materials are present in the body 20 of combustible material in an amount of about 0.5% to about 35% by weight based on the weight of the body 20 of combustible material. Preferably, the cellulosic binder materials in the body 20 of combustible material comprise an amount of about 0% to about 34.5% by weight of a Group II cellulose acetate butyrate binder and an amount of about 0.5% to about 30% by weight of the Group I binder CAB 171-15S. Most preferably, the cellulosic binder materials in the body 20 of combustible material comprise an amount of about 8% of a Group II cellulose acetate butyrate binder and an amount of about 4% the Group I binder CAB 171-15S.

The body 20 of combustible material may also include a non-energetic plasticizer. Any non-energetic plasticizer typically employed in the manufacture of low vulnerability ammunition may be used. Suitable non-energetic plasticizers include, but are not limited to, tributylcitrate, acetyltriethylcitrate, aretyltributylcitrate, alkylcitrates, alkylesters, arylesters, and alylarylesters. Preferably, when a non-energetic plasticizer is used, it is desirable that the non-energetic plasticizer be tributylcitrate or acetyltriethylcitrate.

When a non-energetic plasticizer is used, it is further desirable that the non-energetic plasticizer be present in the body 20 of combustible material in an amount of no more than about 12% by weight based on the weight of the body 20 of combustible material. Preferably, the non-energetic plasticizer is present in the body 20 of combusted material in an amount of about 7.6% by weight based on the weight of the body 20 of combustible material.

The body 20 of combustible material may also include an energetic plasticizer. Any energetic plasticizer typically employed in the manufacture of low vulnerability ammunition may be used. Suitable energetic plasticizers include, but are not limited to, glycidyl azide polymer, alkylnitratoethylnitramines (wherein the alkyl chain can be methyl, ethyl, propyl, or butyl), bis-nitropropylformal, and 1-5-diazido-3-nitrazapentane. When an energetic plasticizer is used, it is desirable that the energetic plasticizer be present in the body 20 of combustible material in an amount of no more than about 12% by weight based on the weight of the body 20 of combustible material.

The body 20 of combustible material may also include components which react with at least some of the $NO_x$ which is produced upon combustion of the body of combustible material. Suitable components include ethyl centralite and n-methyl paranitroaniline. When these components are used, it is desirable that they be present in the body 20 of combustible material in an amount of no more than about 4% by weight based on the weight of the body 20 of combustible material. Preferably, ethyl centralite is present in the body 20 of combustible material in an amount of about 0.4% based on the weight of the body 20 of combustible material.

The supply of stored gas is stored in the container 16 at a pressure of about 1,000 psi to about 5,000 psi, preferably about 3,000 psi to about 3,500 psi. The supply of stored gas in the chamber 16 comprises one or more inert gases and preferably also comprises at least one oxidizer gas.

The preferred inert gases are helium and argon. Preferably, the inert gases comprise a mixture of argon and helium, with the helium being present in an amount sufficient to act as a leak detector.

The oxidizer gas is any gas capable of oxidizing the body 20 of combustible material and its combustion products to produce essentially non-toxic combustion products. Preferably, the oxidizer gas is oxygen. The oxygen is preferably the only gas other than the inert gases present in the supply of stored gas.

Preferably, the supply of stored gas comprises, on a weight basis, 10% to 25% oxygen, 1% to 5% helium, with the balance being argon. The most preferred composition of the supply of stored gas is 75% argon, 20% oxygen, and 5% helium.

Upon the occurrence of sudden vehicle deceleration of a magnitude and duration requiring inflation of the air bag 4, the crash sensor 6 completes an electrical circuit to activate the igniter 32 (FIG. 3) in a known manner. This results in ignition of the pyrotechnic charge in the igniter 32. Burning of the pyrotechnic charge in the igniter 32 generates hot gas which ruptures the relatively thin seal cup 200.

Rupturing the seal cup 200 enables hot gases from the burning ignition charge to flow through the passage 90 in the base section 74 of the housing 22. The hot gases ignite the body 20 of combustible material to produce combustion products such as gas and heat.

Upon ignition of the body 20 of combustible material, the combustion products are conducted through the passages 134 of the strainer 120 of the housing 22 and apply pressure against the end wall 166 of the closure member 24. The pressure applied against the end wall 166 of the closure member 24 results in the transmission of tensile forces through the side wall 164 of the closure member to the skirt section 162 of the closure member. These tensile forces are effective to break the frangible section 176 (FIG. 3) of the skirt section 162.

Upon breaking of the frangible section 176 of the skirt section 162, the pressure applied by the combustion products from the burning body 20 of combustible material moves the closure member 24 away from the end wall 58 of the container 12 toward the opposite end wall 44 (see FIG. 5). The closure member 24 then separates from the housing 22 and comes to rest adjacent to the end wall 44 of the container 12 (FIG. 5). The strainer 120, the spring 118, and the retainer 116 are retained in the housing 22 by the crimp 130.

As soon as the frangible section 176 in the skirt section 162 (FIG. 3) breaks, the combustion products from the body 20 of combustible material mix with and heat the stored gases in the chamber 16 to form an air bag inflation fluid. The pressure from the inflation fluid transmitted from the manifold chamber 182 through the discharge passages 28 ruptures the seal 70 (FIGS. 3 and 5). The inflation fluid then flows from the chamber 16 through the discharge openings 28 into the diffuser chamber 222 through the openings 220 and into the air bag 4. The openings 28 and the diffuser 36 thus comprise a conduit for directing the inflation fluid into the air bag 4. The air bag 4 is thus inflated to the desired volume by the inflation fluid.

An advantage to using the quantity of non-metallic nitrogen containing compound to generate heat is that metallic by-products are not produced. The combustion products produced by the ignition of the non-metallic nitrogen containing compound are relatively smokeless. Thus, the inflator 10 does not require a filter.

The use of a Group I binder in an amount between about 0.5% to about 30% by weight of the body of combustible material increases the heat deformation temperature of the body of combustible material. This reduces the potential for heat induced mechanical deformation (i.e., melting), agglomeration or creep of the body of combustible material relative to prior art bodies of combustible material that do not contain any Group I binder. When mechanical deformation of a propellant occurs, the shape of the propellant, including any passages in the propellant, may undergo changes. The changes in the shape of the propellant, and especially the passages most likely will affect the reliability of ignition and the output production of the propellant. This is because the shape and size of the propellant and the arrangement and size of the passages are specifically designed to provide a desired ignition rate, burn rate and overall output for the propellant in a given inflator. Thus, since the body of combustible material of the present invention has a higher heat deformation temperature than prior art bodies of combustible material, it has a greater reliability of ignition and output production than prior art bodies of combustible material since the body of combustible material of the present invention is less likely to undergo heat induced deformation than the prior art bodies of combustible material.

The following Example illustrates the present invention.

Prior art propellants were prepared containing about 50% cyclotrimethylenetrinitramine, about 20% potassium perchlorate, about 10% potassium nitrate, about 12% cellulose acetate butyrate, about 7.6% tributylcitrate, and about 0.4% ethyl centralite. The cellulose acetate butyrate in the prior art propellants is a Group II binder and has about 37% butyryl groups by weight based on the weight of the cellulose acetate butyrate and has a melting point in the range of about 195° C. to about 205° C. These prior art propellants are designated EX. 1 through EX. 6 in FIG. 6.

Figure 6:
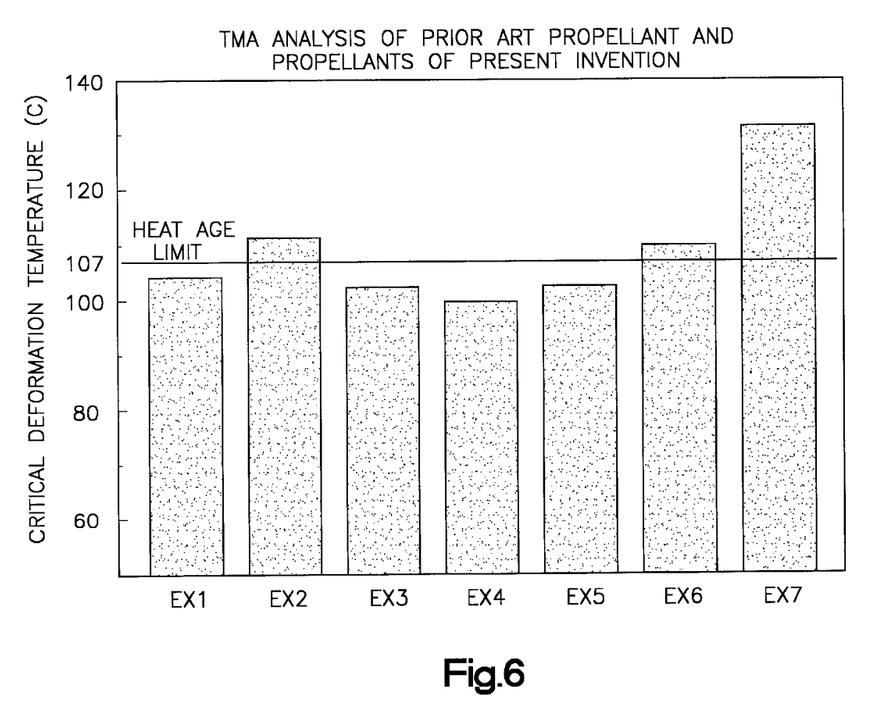
FIG. 6 is a graph showing the critical deformation temperature of a propellant of the present invention and prior art propellants.

Also prepared were propellants of the present invention which are designated EX. 7 in FIG. 6. The propellants of EX. 7 have the following composition by weight, about 50% cyclotrimethylenetrinitramine, about 20% potassium perchlorate, about 10% potassium nitrate, about 8% of a Group II cellulose acetate butyrate binder having a melting point in the range of about 195° C. to about 205° C., about 4% of the Group I binder CAB 171-15S, about 7.6% tributylcitrate, and about 0.4% ethylcentralite. Essentially, the only difference between the present invention propellants of Ex. 7 and the prior art propellants of EXS. 1–6 is that about 4% by weight of the Group II cellulose acetate butyrate binder in EXS. 1–6 having a melting point in the range of about 195° C. to about 205° C. is replaced with the cellulosic Group I binder CAB 171-15S, which has a melting point in the range of about 230° C. to about 240° C.

The critical deformation temperature of the propellants of Examples 1–7 were then measured in a thermomechanical analysis apparatus at a load of about 8.8 psi (which is approximately the load in an air bag inflator) and are shown in FIG. 6. The critical deformation temperature is the temperature at which a predetermined amount (usually about 0.3 mm) of mechanical deformation (i.e., compression) of the propellant occurs. As can be seen in FIG. 6, the use of the CAB 171-15S in EX. 7 increases the critical deformation temperature of the propellants of the present invention by about 25° C. to about 35° C. over the prior art propellants of EXS. 1–6. It was also determined that the CAB 171-15S also eliminates propellant grain deformation at temperatures of about 80° C. to about 120° C. It was further determined that at temperatures above ambient, the propellant modulus of the propellants of the present invention significantly increases relative to prior art propellants (1884 psi for the propellants of the present invention with the Group I binder versus 1088 psi for the prior art propellants with only Group II binder). The higher molecular weights of the Group I binders also decrease the grain brittleness of the propellants of the present invention during cold inflator testing relative to prior art propellants containing Group II binders only.

The propellants of Examples 3 and 7 were then placed in an inflator and subjected to a temperature of 107° C. for varying times and then inspected for propellant deformation. Photographs of the propellants were taken after the temperature treatment.

Figure 7:
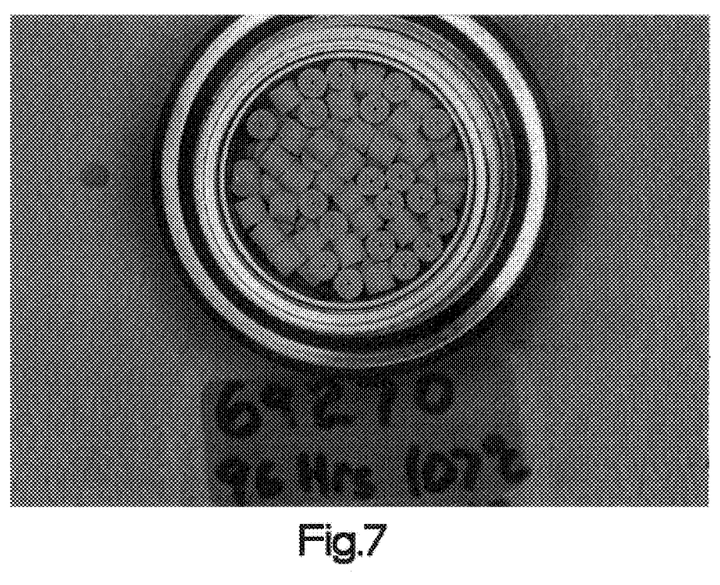
FIG. 7 is a photograph of propellants of the present invention exposed to temperatures of 107° C. for 96 hours.

FIG. 7 depicts the propellant grains of Example 7 after being subjected to a temperature of 107° C. for 96 hours. The grains of Example 7 in FIG. 7 were easily separated with light finger nail force and were not deformed.

Figure 8:
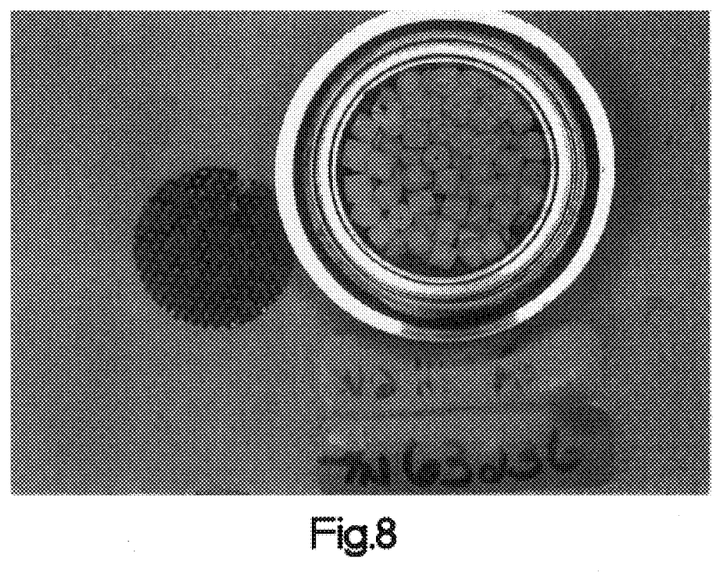
FIG. 8 is a photograph of prior art propellants exposed to temperatures of 107° C. for 96 hours.

FIG. 8 depicts the propellant grains of Example 3 after being subjected to a temperature of 107° C. for 96 hours. Compaction of the grains in FIG. 8 occurred both axially (due to spring loading) and radially (due to gravitational forces). The grains in FIG. 8 could not be easily separated.

Figure 9:
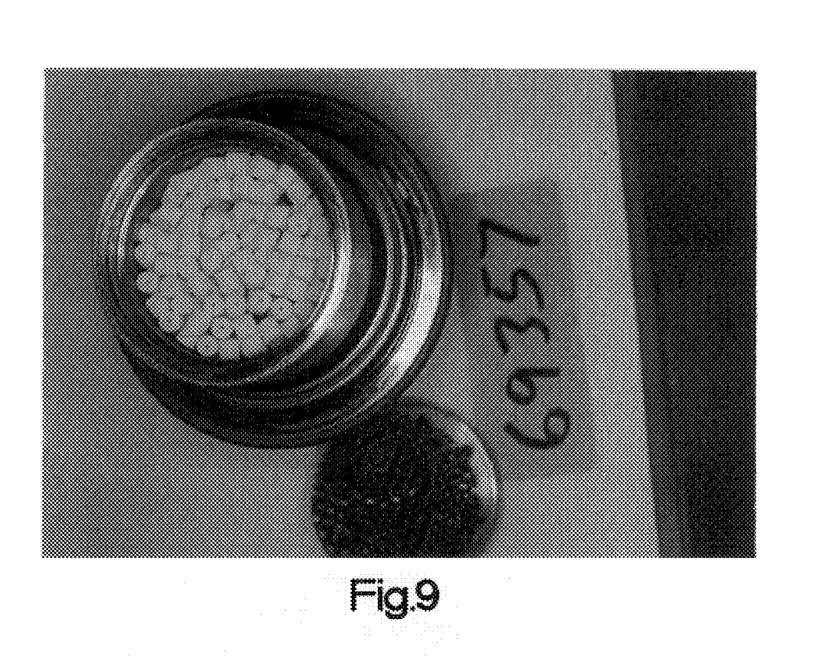
FIG. 9 is a photograph of propellants of the present invention exposed to temperatures of 107° C. for 250 hours.
Figure 10:
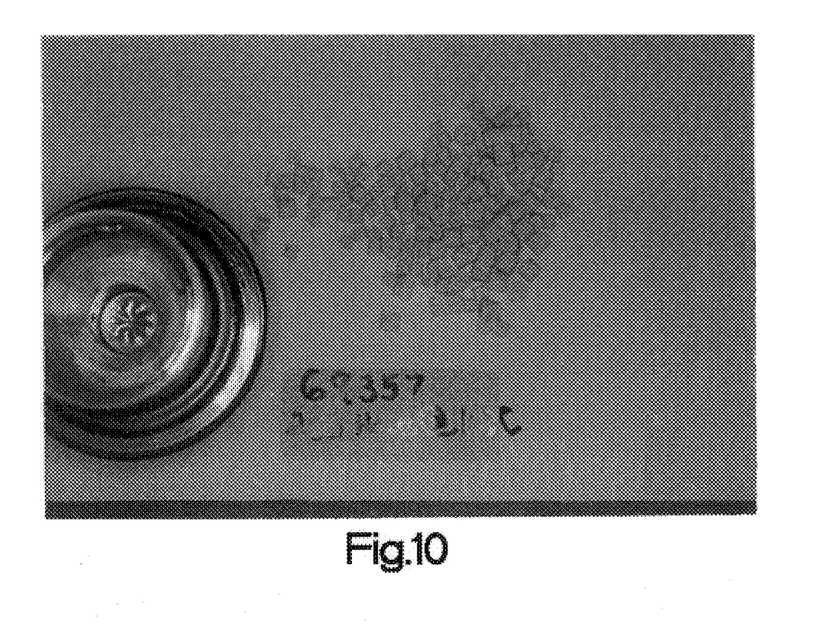
FIG. 10 is another photograph of the propellants of FIG. 9.

FIGS. 9 and 10 depict the propellant grains of Example 7 after being subjected to a temperature of 107° C. for 250 hours. The grains of Example 7 in FIGS. 9 and 10 were easily separated with light finger nail force and were not deformed.

Figure 11:
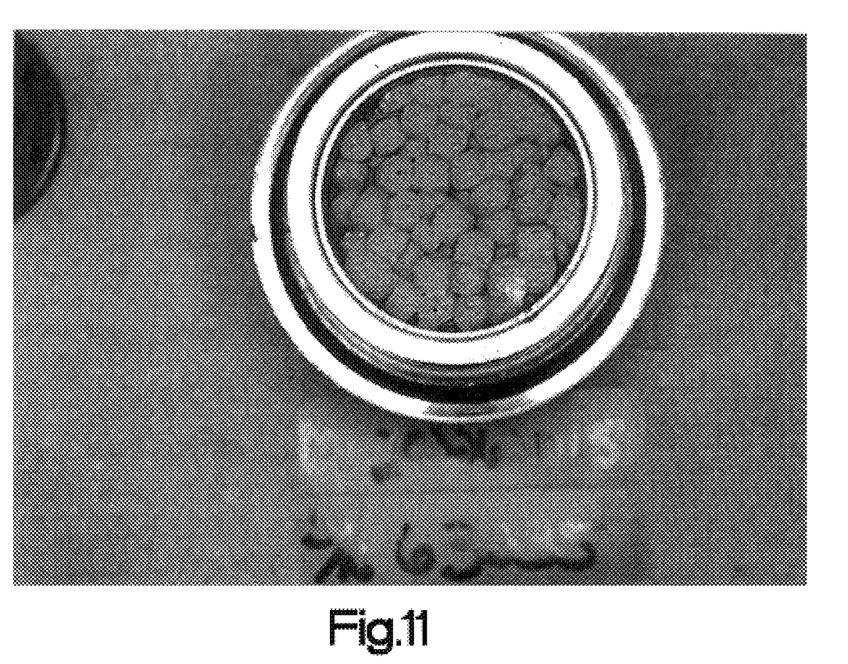
FIG. 11 is a photograph of prior art propellants exposed to temperatures of 107° C. for 400 hours.

FIG. 11 depicts the propellant grains of Example 3 after being subjected to a temperature of 107° C. for 400 hours. Compaction of the grains of FIG. 11 occurred both axially (due to spring loading) and radially (due to gravitational forces). The grains from FIG. 11 could not be easily separated.

The propellant grains of Example 7 were subjected to temperatures of 107° C. for 400 hours. However, no photographs of the grains of Example 7 exposed to temperatures of 107° C. for 400 hours are available due to accidental loss of the negative image due to improper exposure. However, the grains of Example 7 after exposure to temperatures of 107° C. for 400 hours were easily separated with light finger nail force and were not deformed.

From the above description of the invention, those skilled in the art will perceive improvements, changes and modifications. Such improvements, changes and modifications within the skill of the art are intended to be covered by the appended claims.

What is claimed is:

1. An apparatus for use in inflating a vehicle occupant protection device, the apparatus comprising:

a container;

a combustible material stored in the container, the combustible material comprising a first binder selected from the group consisting of cellulose acetate butyrate having a butyryl content of less than about 30% by weight based on the weight of the cellulose acetate butyrate, and cellulose acetate propionate having a propionyl content of more than about 30% by weight based on the weight of the cellulose acetate propionate, wherein the first binder has a melting point in the range of about 230° C. to about 260° C.;

igniter means for igniting the combustible material, the combustible material when ignited, burning and generating combustion products; and a conduit for directing the combustion products toward the vehicle occupant protection device.

2. The apparatus of claim 1 wherein the combustible material further comprises a second binder selected from the group consisting of cellulose acetate butyrate having a butyryl content of more than about 30% by weight based on the weight of the cellulose acetate butyrate, cellulose acetate propionate having a propionyl content of less than about 30% by weight based on the weight of the cellulose acetate propionate, nitrocellulose, and cellulose acetate, wherein the second binder has a melting point in the range of about 125° C. to about 205° C.

3. The apparatus of claim 2 wherein the first binder is present in an amount of about 0.5% to about 30% by weight based on the weight of the combustible material.

4. The apparatus of claim 2 wherein the combustible material further comprises a non-metallic nitrogen containing compound.

5. The apparatus of claim 4 wherein the non-metallic nitrogen containing compound is selected from the group consisting of nitroguanidine, triaminoguanidine nitrate, ethylenediamine dinitrate, 1,3,3-trinitroazetidine, cyclotrimethylenetrinitramine, cyclotetramethylenetetranitramine, trinitrotoluene, 2,4,6-trinitrophenylmethylnitramine, pentaerythritol tetranitrate, and mixtures thereof.

6. The apparatus of claim 2 wherein the combustible material further comprises an oxidizer material in an amount of up to about 60% by weight based on the weight of the combustible material, the oxidizer material being selected from the group consisting of ammonium nitrate, alkali metal nitrates, alkali-earth metal nitrates, ammonium perchlorate, alkali metal perchlorates, alkaline-earth metal perchlorates, oragano-ammonium nitrates, and ammonium dinitramide.

7. The apparatus of claim 6 wherein the combustible material further comprises cyclotrimethylenetrinitramine in an amount of about 20% to about 80% by weight based on the weight of the combustible material.

8. The apparatus of claim 3 wherein the first binder and the second binder are present together in an amount of no more than about 35% by weight based on the weight of the combustible material.

9. The apparatus of claim 2 wherein the first binder is present in an amount of about 0.5% to about 30% by weight based on the weight of the combustible material, and wherein the second binder comprises cellulose acetate butyrate having a butyryl content of more than about 30% by weight based on the weight of the cellulose acetate butyrate or cellulose acetate propionate having a propionyl content of less than about 30% by weight based on the weight of the cellulose acetate propionate.

10. The apparatus of claim 9 wherein the first binder is cellulose acetate butyrate having a butyryl content of about 17% by weight based on the weight of the cellulose acetate butyrate.

11. The apparatus of claim 9 wherein the first binder is cellulose acetate butyrate having a butyryl content of about 17% by weight based on the weight of the cellulose acetate butyrate, the first binder being present in an amount of about 4% by weight based the weight of the combustible material, and wherein the second binder is cellulose acetate butyrate having a butyryl content of more than about 30% by weight based on the weight of the cellulose acetate butyrate, the second binder being present in an amount of about 8% by weight based on the weight of the combustible material.

12. The apparatus of claim 2 wherein the first binder and the second binder comprise a mixture of binder materials, the mixture of binder materials having a glass transition temperature of no more than about 165° C.

13. The apparatus of claim 12 wherein the second binder comprises cellulose acetate.

14. The apparatus of claim 13 wherein the cellulose acetate is present in an amount of no more than about 6% by weight based on the weight of the combustible material.

15. The apparatus of claim 12 wherein the second binder comprises nitrocellulose.

16. The apparatus of claim 15 wherein the nitrocellulose is present in an amount of no more than about 6% by weight based on the weight of the combustible material.

17. The apparatus of claim 2 further comprising a gas stored in the container.

18. The apparatus of claim 17 wherein the gas comprises an inert gas and an oxidizer gas.

* * * * *